May 13, 1969     D. R. NELAN     3,444,213
CONTINUOUS PROCESS FOR PRODUCING dl ALPHA TOCOPHEROL
Filed July 12, 1967
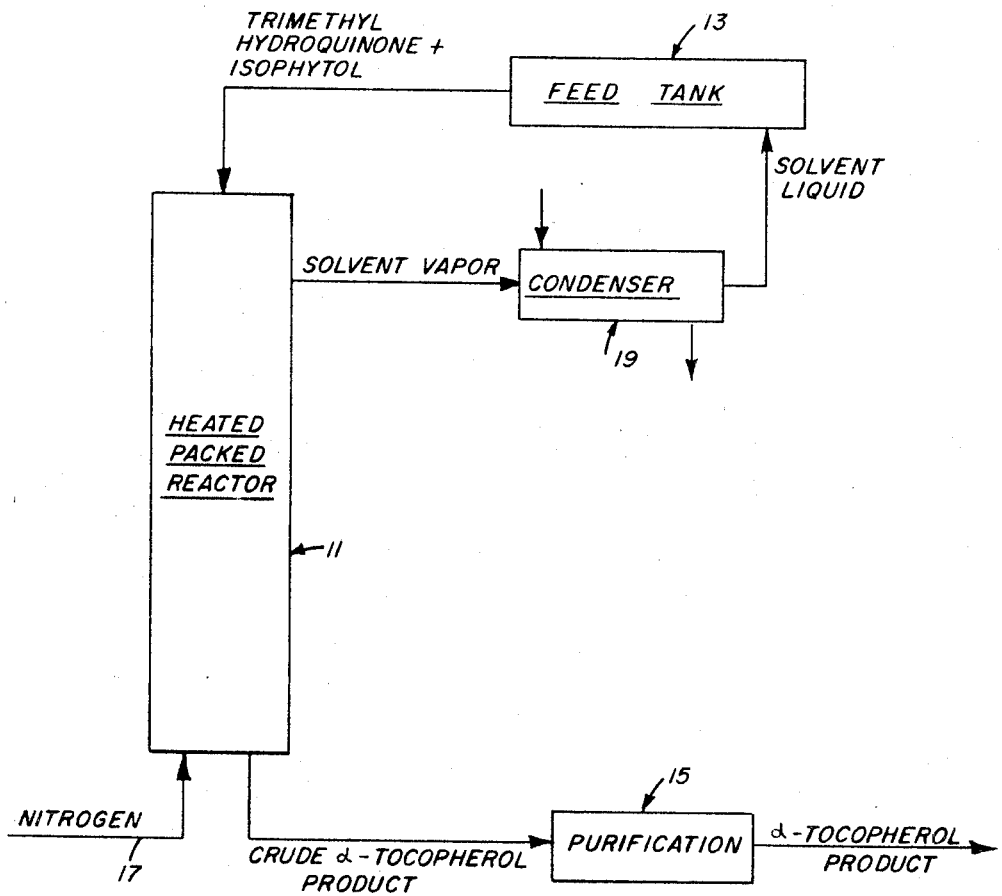
DONALD R. NELAN
INVENTOR.
BY
ATTORNEYS United States Patent Office
3,444,213
Patented May 13, 1969

3,444,213
CONTINUOUS PROCESS FOR PRODUCING dl ALPHA TOCOPHEROL
Donald R. Nelan, Rochester, N.Y., assignor to Eastman Kodak Company, Rochester, N.Y., a corporation of New Jersey
Filed July 12, 1967, Ser. No. 652,912
Int. Cl. C07d 7/22
U.S. Cl. 260—345.5         8 Claims

ABSTRACT OF THE DISCLOSURE

A process has been found which provides high yields of high purity dl-α-tocopherols. The process comprises progressively and simultaneously introducing trimethylhydroquinone, phytol or isophytol or phytadiene, and an acid condensation catalyst, advantageously all in an organic solvent, into a packed reaction column which is maintained at a temperature above the distillation temperature of the solvent but below the distilling temperature of the reactants. The catalyst and other reactants are flowed continuously through the column, and solvent is continuously distilled upwardly countercurrently to the flowing reaction mixture. Crude dl-α-tocopherol product is progressively withdrawn from the column and subsequently purified.

BACKGROUND OF THE INVENTION

Field of the invention

This invention is directed to an improved process for effecting the condensation of trimethylhydroquinone with phytol or isophytol or phytadiene to dl-α-tocopherols.

Description of the prior art

The preparation of dl-α-tocopherol by the condensation of trimethylhydroquinone and phytol or derivatives thereof in the presence of solvents and condensing agents is an old and well known reaction. Heretofore, these condensation reactions have been effected by means of a batch reaction requiring reflux of solutions of the reactants, as reported for instance in Helvetica Chimica Acta, vol. 21, page 520, and in U.S. Patent 2,411,967. Unfortunately, these batch reactions necessitate long reflux times, usually of at least two or more hours, and provide less than the desired yields. In addition, the crude α-tocopherol product obtained from batch reactions requires extensive purification by repeated chromatography to separate the by-products and unreacted starting materials from the dl-α-tocopherol. Even then the final purified product is of lower purity and in lower yield than desired.

Summary of the invention

A condensation process has now been found which is effected in a relatively short period of time to provide a crude dl-α-tocopherol reaction product which surprisingly can be purified far more easily than the crude product obtained by prior art procedures, to obtain a purer final product in greater yield. In addition the process provides for the continuous and progressive production of α-tocopherol without the necessity of processing large batches of reaction mixtures.

In accordance with the method of the invention trimethylhydroquinone, phytol or isophytol or phytadiene, and an acid condensation catalyst are continuously, progressively and simultaneously introduced into one end of a packed reaction column maintained at a superatmospheric temperature which will permit the reaction to occur. The mixture of reactants and catalyst are caused to flow continuously in liquid form through the packed column, and crude dl-α-tocopherol reaction product is progressively withdrawn from the opposite end of the column.

The reactants advantageously are introduced in equivalent molar quantities to the top of the reaction column simultaneously with the acid condensation catalysts, and flow down by gravity at a rate such that reaction is substantially complete by the time the reaction mixture reaches the bottom of the reaction column. The catalyst can be separate from, or mixed with, the other materials. The trimethyl hydroquinone, being normally solid, can be liquified by melting, or it can be dissolved in an excess of the phytol, isophytol or phytadiene. It is preferred, however, to use as a reaction medium an organic solvent which is inert in the sense of not entering into the reaction, and to dissolve both the reactants and the acid catalysts in the inert solvent. The premixture of the reactants and acid condensation catalyst may then be introduced into the reaction column.

In the condensation reaction, any water liberated is continuously distilled from the reaction mixture as soon as it is formed when the temperature is above the distilling temperature of water. Solvent reaction medium is similarly distilled if utilized. Removal of the water and/or solvent out of the reaction zone is effected by distilling the water and solvent countercurrently to the flowing liquid stream of reactants and catalysts. When the temperature is below the boiling point of water the reaction proceeds successfully, but a somewhat longer residence time is required in the reaction column.

The catalyst employed in the process of the invention can be any of the well known acid condensation catalysts. Illustrative of these catalysts are the Lewis acids such as borontrifluoride, borontribromide, aluminum chloride, aluminum bromide, zinc chloride, borontrifluoridephosphoric acid complex, chlorosulfonic acid, p-toluene sulfonic acid, formic acid, and potassium acid sulfate.

Other catalysts which may be used include hydrogen fluoride, hydrogen bromide, and hydrogen fluorideborontrifluoride mixture. A catalytically effective amount of catalyst is employed ordinarily falling in the range of 0.1 to 1.0 mole per mole of phytol, isophytol or phytadiene. The substantially inert organic solvents which may be employed in the present invention are those solvents boiling below the distilling temperatures of the reactants and desired product. Suitable inert solvents include the aliphatic hydrocarbon solvents of 7 to 12 carbon atoms or more, as for example, n-heptane; carboxylic acids having 2–6 carbon atoms such as acetic acid, propionic acid, butanoic acid, hexanoic acid, aromatic solvents such as xylene, benzene, toluene; ethers such as isopropyl ether, dioxane, tetrahydrofuran.

The packed column of the invention contains packing material such as glass helices, Berl saddles or similar well known packing materials. The reactants can be introduced from a constant rate addition funnel at the top of the column. The rate of product formation will, of course, depend upon the size of the packed column employed since the reactants can be added at any desired rate up to the point where the column becomes flooded. As aforementioned, the packed column is maintained at a temperature above the distilling temperature of any inert solvent employed and advantageously of any concomitant water liberated, but below the distilling temperature of the reactants and desired product. Ordinarily the temperature will fall in the range of about 70 to about 150° C. The process of the invention is thus readily adaptable for commercial production and has the further advantage of being able to be run continuously for prolonged periods of time with uniform results and with a minimum of supervision. Once the reaction rate for optimum conversion has been established, the reactants can be continuously fed into the reaction zone at the predetermined rate and the product continuously withdrawn without necessitating any further adjustments.

Crude dl-α-tocopherol continuously withdrawn from the bottom of the column can be purified by the purifying techniques illustrated in the examples. This crude product contains not only tocopherol, but also excess reactants, catalyst, and often some residual solvent.

Brief description of the drawing

The single figure of the drawing is a schematic flow sheet showing apparatus for performing the continuous process.

In the drawing 11 is a reaction column which is packed with suitable material such as glass helices and is externally heated by electrical or other means. The reactants are combined in a feed tank 13 and flow continuously into the top of the column 11 and down through the packing to the bottom, from which they are discharged for subsequent purification in apparatus 15.

A stream of nitrogen is introduced into the bottom of column 11 through a line 17 and flows upwardly along with distilled solvent vapor and any water vapor. All vapors leave the column near the top and those which are condensible are liquified in a condenser 19. Solvent is returned from condenser 19 to feed tank 13. Water is eliminated from the system in any desired way, as by decantation.

The reactor column 11 used in the following examples is a 1 x 16 inch glass column packed with glass helices. The column is externally heated with an electric tape. Feed tank 13 is a constant rate addition funnel (set to feed 1 ml. per minute) on top of the column. There is a receiver for crude product at the bottom. A nitrogen inlet in the receiver allows for a small counterflow of nitrogen during each reaction to help carry vapors up through the column and to exclude oxygen. Of course, other inert gas such as argon or helium could be used.

Description of the preferred embodiments
EXAMPLE I 5.93 g. (0.02 mole) isophytol is added to 3.64 g. (0.024 mole) trimethylhydroquinone and 3 ml. of boron trifluoride etherate in 50 ml. of glacial acetic acid. The solution is added from the constant rate addition funnel over a period of approximately 1 hour to the preheated (110–120° C.) column with the temperature maintained to distill most of the solvent. The first of the crude product reaches the bottom of the column (where the temperature is 130° C.) in approximately 15 minutes and is collected in the receiver. Upon completion, the column is cooled and washed with ether, and the ether solution is added to the collected crude product.

Then 5 ml. acetic anhydride and 5 ml. of pyridine are added to the collected product, the ether is evaporated and the residue heated for 1 hour on a steam bath. The product is poured on ice and extracted with petroleum ether. The peroleum ether solution is washed with water, dilute hydrochloric acid, and then water to neutrality, and finally is dried with anhydrous sodium sulfate. The petroleum ether is then evaporated and leaves a residue of 11.7 g. which exhibits an ultra violet absorption spectrum ($E$ (1%, 1cm.) (284 m$\mu$)=34.5). The residue is dissolved in petroleum ether and then adsorbed in a chromatograph column (2 x 10") of Florisil (magnesium silicate from the Floridin Co.). Elution of the column with 20% ether in petroleum ether solvent, and evaporation of the solvent leaves a straw colored residue consisting of α-tocopheryl acetate, 8.35 g. ($E$ (1%, 1 cm.) (284 m$\mu$)=42.6 corresponding to a purity of 98%), yield: 87%.

EXAMPLE II 5.93 g. (0.02 mole) isophytol is added to 3.04 g. (0.02 mole) trimethylhydroquinone and 3.0 ml. boron trifluoride etherate in 50 ml. dioxane. The solution is added from the constant rate addition funnel and reaction run and crude product collected as in Example I. The column is washed with ether and the ether solution added to crude product.

The the crude product is washed with water, dilute potassium hydroxide solution, and then water to neutrality, and finally dried with anhydrous sodium sulfate. Evaporation of the solvent leaves a residue, 8.67 g.($E$ (1%, 1 cm.) (291 m$\mu$)=68.5). The residue is adsorbed from petroleum ether on a column of Florisil (1½ x 9") and the α-tocophercol eluted with 15% ether in petroleum ether. Evaporation of the solvent leaves a residue of dl-α-tocopherol 6.53 g. ($E$ (1%,1cm.) (292 m$\mu$)=71.2, corresponding to a purity of 96%). Yield 75%.

EXAMPLE III 5.93 g. (0.02 mole) phytol is added to 3.04 g. (0.02 mole) trimethylhydroquinone and 1.0 g. (.0075 mole) fused zinc chloride dissolved in 50 ml. of propionic acid. The solution is added to the preheated column as in previous examples. The reaction product 9.31 g., $E$ (1%, 1 cm.) (287 m$\mu$)=50.5 is a mixture of free and esterified α-tocopherol.

The 9.31 g. reaction is dissolved in 250 ml. ethanol, refluxed in a steam bath for a few minutes and then 3.0 g. potassium hydroxide pellets are added through the condenser. The reflux is continued for 20 minutes, 6 ml. concentrated hydrochloric acid is added through the condenser, the reaction mixture is cooled, diluted with water and extracted three times with petroleum ether. The combined petroleum ether solution is washed with water, N/2 potassium hydroxide solution to remove any unreacted trimethylhydroquinone, and finally with water to neutrality. After drying with anhydrous sodium sulfate, the solvent is evaporated to give 8.05 g. of an α-tocopherol concentrate ($E$ (1%, 1 cm.) 292 m$\mu$)=61.4 corresponding to a purity of 83%). Yield 75%.

EXAMPLE IV 2.96 g. (0.1 mole) phytol is added to 4.56 g. (0.03 mole) trimethylhydroquinone and 1.36 g. (0.01 mole) fused zinc chloride dissolved in 75 ml. of glacial acetic acid. The solution is added from the constant rate addition funnel to the preheated column as in previous examples. The collected reaction product, 4.35 g., $E$ (1%, 1 cm.) (291 m$\mu$)=68.1, contains free tocopherol and some esterified tocopherol. The 4.35 g. reaction product is combined with 25 ml. of ethanol and 20 ml. of 5 N sulfuric acid in ethanol and refluxed for 3 hours on a steam bath. The ethanol solution is cooled, diluted with water and extracted three times with petroleum ether. The combined petroleum ether solution is washed with water, $N/2$ potassium hydroxide solution, and finally with water to neutrality. After drying over anhydrous sodium sulfate the petroleum ether is evaporated to give 4.26 g. of α-tocopherol which assays 93% purity by the Emmerie-Engel assay procedure. Yield 92%.

EXAMPLE V 2.96 g. (0.01 mole) phytol is added to 3.04 g. (0.02 mole) trimethylhydroquinone and 1.36 g. (0.01 mole) fused zinc chloride in 75 ml. glacial acetic acid. The solution is added from the addition funnel to the preheated column and the product collected at the bottom of the column. The reaction product, 4.53 g., ($E$(1%, 1 cm.) (290 m$\mu$)=63.9)

is saponified (EtOH:KOH) to give 4.3 g. of an α-tocopherol concentrate, ($E$ (1%, 1 cm.) (292 m$\mu$)=68.1; Emmerie Engel assay, 82.5% α-tocopherol). Yield 83%.

The following example illustrates a typical preparation using Batch Reflux procedure, and is included for purposes of comparison to show the improvement in yield and purity by the present invention.

EXAMPLE VI 10.41 g. (.0685 mole) trimethylhydroquinone, 4.74 g. (0.035 mole) fused zinc chloride are combined in 38 ml.

glacial acetic acid in a 200 ml. 3-necked flask fitted with a reflux condenser, nitrogen inlet and dropping funnel. 22.0 g. (0.0743 mole) phytol are added dropwise during reflux in a nitrogen atmosphere. Addition time is 1 hour, with reflux continued for three more hours.

The crude reaction product is poured on ice and extracted with petroleum ether. The petroleum ether solution is washed with water, N/2 potassium hydroxide solution to remove acetic acid and unreacted trimethylhydroquinone, and finally with water to neutrality. Evaporation of the solvent leaves a residue, 30.63 g.

$$(E\ (1\%,\ 1\ cm.)\ (291\ m\mu) = 59.3)$$

The residue is adsorbed from petroleum ether solution in a chromatograph column (2¼ x 21") of Florisil. The α-tocopherol is eluted from the column with 10% ether in petroleum ether. Evaporation of the solvent leaves a residue of 24.6 g. ($E\ (1\%,\ 1\ cm.)\ (291\ m\mu) = 65.3$, Emmerie-Engel assay 84% α-tocopherol). The crude tocopherol concentrate is readsorbed a second time on a column (2¼ x 29") of Florisil and eluted with 1% ether in petroleum ether, 5% ether in petroleum ether and finally with ether, to give three fractions after evaporation of the solvent: (1) 11.18 g., $$E\ (1\%,\ 1\ cm.)\ (292\ m\mu) = 59.1$$

Emmerie-Engel assay 79.9% α-tocopherol; (2) 7.87 g., $E\ (1\%,\ 1\ cm.)\ (292\ m\mu) = 73.4$, Emmerie-Engel assay 98.4% α-tocopherol; and (3) 4.03 g., $$E\ (1\%,\ 1\ cm.)\ (292\ m\mu) = 61.0$$

Emmerie-Engel assay 72.8% α-tocopherol. Yield 67%. Fractions 1 and 3 could be further purified by repeated chromatography.

By comparison of Example VI with the Examples I–V representing the process of the present invention, it can be seen that the process of the invention provides superior yields of higher quality product, with only one pass through the chromatograph column in contrast to the poorer results with two passes of the batch-produced product.

Although the invention has been described in detail with reference to certain preferred embodiments thereof, it will be understood that variations and modifications may be incorporated without departing from the spirit and scope of the invention as described hereinabove, and as defined in the appended claims.

I claim:
1. In the process of preparing dl-α-tocopherol by condensing trimethylhydroquinone with phytol or isophytol or phytadiene in the presence of an acid condensation catalyst, the improvement which comprises progressively and simultaneously introducing said trimethylhydroquinone, phytol or isophytol or phytadiene, and an acid condensation catalyst into a heated packed column, continuously flowing the mixture of reactants and catalyst in liquid form through the packed column, and progressively withdrawing crude dl-α-tocopherol reaction product from the column.

2. The process of claim 1 wherein the trimethylhydroquinone, phytol or isophytol or phytadiene, and acid condensation catalyst are dissolved in a substantially inert solvent reaction medium, and the resulting solution is introduced progressively into said packed column; wherein the temperature is above the distilling temperature of said solvent but below the distilling temperature of the reactants; and wherein said solvent is distilled through the column countercurrently to the flowing liquid reaction mixture and is removed from said column.

3. The process of claim 1 wherein the temperature is between about 70 and 150° C.

4. The process of claim 2 wherein the substantially inert organic solvent is a monocarboxylic acid of 2 to 6 carbon atoms.

5. The process of claim 2 wherein the substantially inert organic solvent is dioxane.

6. The process of claim 2, also comprising condensing and recycling the solvent removed from said column.

7. The process of claim 1, also comprising subjecting said crude product to purification to remove excess reactants, catalyst, and any solvents present.

8. The process of claim 1, also comprising introducing an inert gas into said column to flow therethrough.

References Cited
UNITED STATES PATENTS

| | | | |
|---|---|---|---|
| 2,230,659 | 2/1941 | Von Werder | 260—345.5 |
| 2,345,605 | 4/1944 | John et al. | 260—345.5 |
| 2,411,967 | 12/1946 | Karrer et al. | 260—345.5 |
| 2,411,969 | 12/1946 | Karrer et al. | 260—345.5 |

HENRY R. JILES, *Primary Examiner.*

J. M. FORD, *Assistant Examiner.*